Patented Sept. 29, 1942

2,297,098

UNITED STATES PATENT OFFICE 2,297,098

RECTIFYING COLUMN CONTROL

Samuel C. Carney, Bartlesville, Okla., assignor to Phillips Petroleum Company, a corporation of Delaware Application March 23, 1940, Serial No. 325,585

12 Claims. (Cl. 202—40)

The present invention relates to a novel process and control mechanism for rectifying. More particularly, it relates to the control of the composition of top product and the removal thereof which is responsive to the composition or vapor pressure of the material in a rectifying column as compared to the composition or vapor pressure of a standard sample.

In the past, attempts have been made to control the operation of rectifying columns by regulating the temperature or pressure of operation. Such a method of operation is rather inflexible and necessitates continued vigilance on the part of the operator. A rapid change of outside temperature or composition of input results in improper operation.

Customary practice is to place a back pressure regulator at the top of the rectifying column to hold a constant pressure and to place a thermostat in the kettle to maintain a constant temperature. Feed and reflux to the column are governed by flow control. A column operated in this manner will give satisfactory results so long as the composition of the feed and the temperature of the equipment remains constant. Changes in temperature or composition require the operator to make changes in operating conditions to compensate for the changes which are beyond his control. The present invention provides a method and apparatus for controlling the top product in such a manner that the composition of the product remains constant and the tower operates efficiently and economically.

It is one of the objects of the present invention, therefore, to provide a regulating means for a rectifying column which is capable of increasing the flexibility of operation of the same.

A further object of the present invention is to provide a method of controlling the operation of a rectifying column wherein the pressure of the column is balanced against that of a fixed standard.

A still further object of the present invention is to provide a method of controlling the operation of a rectifying column wherein the output is regulated in accordance with the conditions of operation and the type of input.

A further object of the present invention is to provide a controlling device and/or method for a rectifying column capable of regulating the operation thereof while freely permitting pressure and/or temperature changes therein.

Other objects and advantages of the invention will be apparent during the course of the following description.

Figure 1:
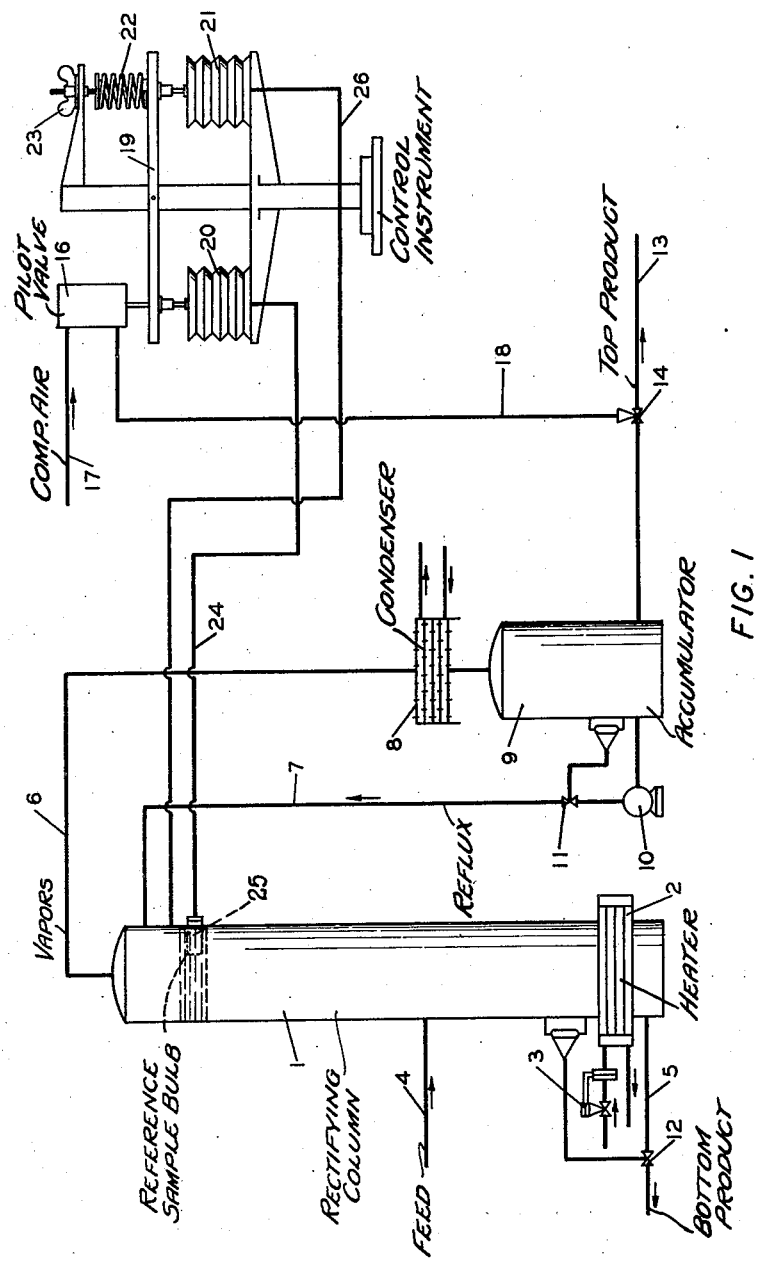

In the accompanying drawings forming a part of this specification and in which like numerals are employed to designate like parts throughout the same, Figure 1 is a diagrammatic view illustrating a device for controlling the output from a rectifying column.

Figure 2:
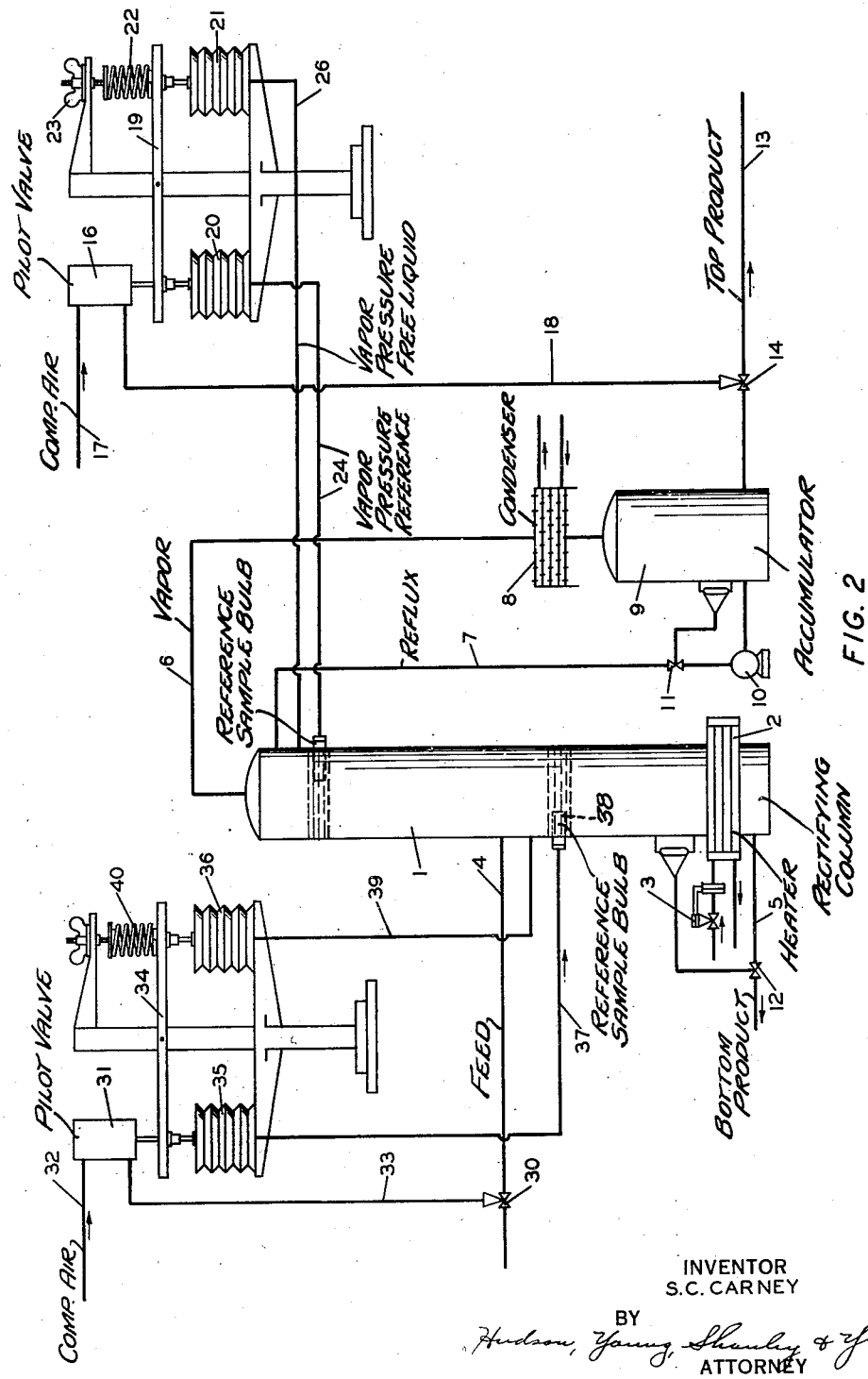

Figure 2 is a diagrammatic illustration of a controlling means for both the input and output of a rectifying column.

Referring to Figure 1 of the drawings, the numeral 1 refers to a conventional rectifying column of any suitable construction provided with heating tubes 2 located in the lower part of the column. Constant heat input to the base of the column is maintained by a flow controller 3 mounted on the steam inlet to the heating tubes. Feed enters the column through line 4, bottoms are withdrawn through line 5, vapor from the top of the column is withdrawn through line 6, and reflux is introduced through line 7. Vapor leaving the top of the column through line 6 passes to condenser 8 where it is condensed and the resultant liquid collected in a suitable accumulator tank 9. The return of reflux through line 7 by pump 10 is effected by a suitable level controlled valve 11. Bottoms output through line 5 is controlled by a smiliar valve 12 responsive to the level in the column 1.

Whithdrawal of product from the accumulator tank 9 through line 13 is controlled by a valve 14. The valve 14 is in turn controlled by a pilot valve 16 connected by a conduit 17 with a source of compressed air and by control line 18 with the valve 14. Pilot valve 16 is operated by a balanced beam 19 which is arranged for movement in one direction by the pressure responsive Sylphon bellows 20 and in the other direction by the pressure responsive Sylphon bellows 21. The spring 22 above bellows 21 may be adjusted either in tension or compression by means of nut 23. The Sylphon bellows 20 is connected by conduit 24 to a capsule 25 located in the column. The Sylphon bellows 21 is connected with the vapor space just above capsule 25 by conduit 26.

The controlling element in the rectifying column is a "reference sample" of the desired top product contained in capsule 25. The capsule 25 is located on one of the plates between the top and the feed where it will be surrounded by the liquid on the plate. Preferably, the capsule is located on a plate where the liquid phase has a composition about 95% as volatile as the liquid phase composition it is desired to maintain on the top plate. Since the capsule 25 is surrounded by the liquid on the plate, the temperature of the capsule is maintained at the temperature of the liquid surrounding the capsule and the pressure transmitted to the Sylphon bellows 20 by conduit 24 is equivalent to the vapor pressure of the reference sample at the temperature of the liquid on the plate. Conduit 26, connected to the vapor space above the plate maintains a pressure in Sylphon bellows 21 equal to the vapor pressure of the liquid on the plate. The pressure in the Sylphon bellows 20 will therefore be greater during normal operation than that in the bellows 21. This difference in pressure is compensated for by adjustment of spring 22.

In operation, heat input to the base of column 1 is adjusted to give the optimum vapor velocity in the upper part of the column. The feed rate is then set to give a bottom product of approximately the desired composition. The vapor pressure of the top product is maintained at a constant value by the present invention. Pressure changes in the column caused by lower or higher outside temperatures or changes in the temperature of the cooling medium supplied to condenser 8 will not affect operations as there will be a corresponding rise or fall in the temperature of both the liquid on the plate and the reference sample in the capsule. The corresponding pressures in the Sylphon bellows 20 and 21 will cancel one another and not affect the balance of beam 19. If, however, the composition of the feed changes so the percentage of lighter components in the feed increases, the liquid surrounding capsule 25 will become richer in the lighter component and its temperature will decrease because of the composition change. This change in temperature will lower the vapor pressure of the reference sample in the capsule 25 and in the Sylphon bellows 20. It is to be noted that the pressure in the Sylphon bellows 21 will not be effected by the composition change since the vapor pressure of the top product is maintained at a constant value. The pressure transmitted to bellows 21 is equal to the vapor pressure of the top product in accumulator 9 plus the pressure drop between the point of sampling and the accumulator. This unbalancing of pressure in the Sylphon bellows will move arm 19 and cause pilot 16 to operate valve 14 to remove more top product. This increase in product removal decreases the quantity of reflux returned to the column through line 7 which in turn decreases the reflux ratio in the column thus compensating for the change in composition of the feed. It is evident that this contributes to the column efficiency since the reflux ratio required for separation by fractionation decreases as the percentage of lighter component in the feed increases. If the percentage of the lighter component in the feed decreases, the liquid surrounding capsule 25 will become richer in the heavier component and its temperature will increase, due to the composition change. The effect on the controls will then be in the reverse direction which will in turn cause a decrease in the rate of removal of top product and an increase in the reflux ratio to compensate for the change in feed composition.

It is apparent that the control will cause the rectifying column to produce a top product of constant vapor pressure regardless of the composition of the feed supplied to the column. By placing the capsule 25 containing the reference sample on a plate between the top plate and the feed plate, it is possible for the control device to detect changes in composition on that plate and so change the operating conditions to maintain uniformity of the top product.

In the modification of the device shown in Figure 2, there is provided in addition to the elements shown in Figure 1, just described, an additional control device which is operative to affect the rate of feed through line 4 and which operates in a manner similar to the control device of Figure 1. In this modification, the flow of feed through pipe 4 is controlled by a valve 30 operated by a pilot valve 31 connected to a source of compressed air by line 32. The pilot valve 31 is connected to valve 30 and operates the same through control line 33. The pilot valve 31 is operated by a balanced beam 34 which is affected by pressure responsive Sylphon bellows 35 and 36. Sylphon bellows 35 is connected by conduit 37 to a capsule 38 located on one of the plates between the feed plate and the bottom where it will be surrounded by the liquid on the plate. The Sylphon bellows 36 is connected with the vapor space just above capsule 38 by conduit 39. A spring 40 is also provided having a balancing function similar to the spring 22.

Assuming the column is separating a two-component mixture, butane from iso-butane, for example, the operation of the control is as follows: The capsule 25 is filled with iso-butane and the capsule 38 with butane. The rate of heat input is adjusted to give an optimum vapor velocity in the column. Let us assume that the column is operating normally with a feed composition of 70% butane and 30% iso-butane and that the composition of the feed changes to 50% butane and 50% iso-butane. The top control described in connection with Figure 1 will of course increase the product taken off, thus reducing the reflux ratio. Assuming, however, that the amount of iso-butane is too large to be thus compensated for, there will result an increase in iso-butane in the entire column and the temperature of the liquid in the lower portion of the column will drop. This lower temperature will not change the pressure on the lower plates transmitted to Sylphon bellows 36 by conduit 39. The lower temperature, however, will lower the vapor pressure of the butane in the capsule 38 which in turn will decrease the pressure in Sylphon bellows 35, causing a movement of arm 34. The movement of arm 34 will operate pilot valve 31 which will act on valve 30 through conduit 33 to reduce the flow of feed through valve 30 and line 4. Similarly, if percentage of butane in the feed increases, the feed control device will operate to increase the rate of feed through valve 30 and line 4.

By the combined effect, therefore, of the two control devices shown in Figure 2, the feed rate is kept at a maximum for column capacity for a given composition of top product.

It is to be understood that the system of Figure 2 can be utilized to separate any two-component mixture and that butane and iso-butane are merely described by way of example.

It is desired to point out that while pressure responsive Sylphon bellows are illustrated in the drawings, any other suitable fluid pressure responsive means may be used. It is to be understood that the form of my invention, herewith shown and described is to be taken as a preferred example of the same, and that various changes in the size, shape, and arrangement of parts may be resorted to without departing from the spirit of my invention, or the scope of the subjoined claims.

I claim:

1. A method of rectification in which distillable fluid to be rectified is fed to a rectification column, heat is applied to the bottom of the column to generate vapor and liquid reflux is supplied at the top of the column, the improvement comprising placing a reference sample of liquid of the composition and vapor pressure it is desired to recover on a plate at a point in the column above the feed and surrounding the reference sample with liquid on the plate, and balancing the vapor pressure of the reference sample against the pressure in the column above the reference sample under desired column conditions, any unbalancing tendencies between the two vapor pressures operating to increase or decrease the amount of reflux supplied at the top of the column to thus regulate the composition and vapor pressure of the product taken from the top of the column.

2. A method of rectifying a distillable fluid mixture comprising supplying the mixture to be rectified to a rectification zone, separating the vapor component and the liquid component of the mixture within said zone, separately withdrawing the vapor and liquid components from the rectification zone, condensing withdrawn vapors, returning a portion of the condensate to the column as reflux, placing a reference sample of liquid of the composition and vapor pressure it is desired to recover on a plate at a point in the column above the feed and surrounding the reference sample with liquid on the plate, and balancing the vapor pressure of the reference sample against the pressure in the column above the reference sample under desired column conditions, any unbalancing tendencies between the two vapor pressures operating to increase or decrease the amount of reflux supplied to the column to thus regulate the composition and vapor pressure of the product taken from the top of the column.

3. A method for the separation of lower from higher boiling components of a distillable fluid mixture comprising feeding the mixture to a closed vessel, heating the mixture to volatilize a portion thereof, withdrawing the volatilized portion from the top of the rectification zone, condensing the withdrawn vapors, returning a portion of the condensate to the column as reflux, placing a reference sample of the liquid of higher boiling point on a plate at a point in the column below the inlet of fluid to be rectified and surrounding this reference sample with liquid on the plate, placing a reference sample of the liquid of lower boiling point on a plate near the top of the column and surrounding this reference sample with liquid on the plate, balancing the vapor pressure of the reference sample of higher boiling point against the pressure in the column directly above the reference sample and below the inlet of fluid to be rectified, balancing the vapor pressure of the reference sample of lower boiling point against the pressure in the column above the reference sample, any unbalancing tendencies between the two vapor pressures of the top reference sample of lower boiling point operating to decrease the amount of reflux supplied to the top of the column and any unbalancing tendencies between the vapor pressure in the reference sample of the higher boiling point liquid and the space thereabove operating to decrease the amount of fluid flowing to the rectification zone.

4. In a control device for a rectifying column with an outlet for vapor, means for condensing said vapor, means for withdrawing a part of the condensate as top product, means for returning the remainder of the condensate to the column as reflux, valve means to regulate the withdrawal of top product, a pilot valve to operate said valve means, and means to operate said pilot valve comprising a pair of opposed pressure operated members, a reference sample on a plate in the column surrounded with liquid on the plate and containing a liquid of the composition and vapor pressure it is desired to recover, a line connecting the reference sample to one of the pressure operated members and a line connecting the space above the reference sample to the other pressure operated member, and means connected to both pressure operated members and movable therewith to operate the pilot valve which in turn opens or closes the valve controlling the withdrawal of top product thereby decreasing or increasing the flow of reflux to the column.

5. In a control device for a rectifying column with an outlet for vapor, means for condensing said vapor, means for withdrawing a part of the condensate as top product, means for returning the remainder of the condensate to the column as reflux, valve means to regulate the withdrawal of top product, a pilot valve to operate said valve means, and means to operate said pilot valve comprising a pair of opposed pressure operated members, a reference sample on a plate in the column surrounded with liquid on the plate and containing a liquid of the composition and vapor pressure it is desired to recover, a line connecting the reference sample to one of the pressure operated members and a line connecting the space above the reference sample to the other pressure operated member, and a pivoted balance means having the ends thereof connected to both pressure operated members and movable therewith to open or close the pilot valve which in turn opens or closes the valve controlling the withdrawal of top product thereby decreasing or increasing the flow of reflux to the column.

6. In a control device for a rectifying column with an outlet for vapor, means for condensing said vapor, means for withdrawing a part of the condensate as top product, means for returning the remainder of the condensate to the column as reflux, valve means to regulate the withdrawal of top product, a pilot valve to operate said valve means, and means to operate said pilot valve comprising a pair of Sylphon bellows, a reference sample on a plate in the column surrounded with liquid on the plate and containing a liquid of the composition and vapor pressure it is desired to recover, a line connecting the reference sample to one of the Sylphon bellows and a line connecting the space above the reference sample to the other Sylphon bellows, and means connected to both Sylphon bellows and movable therewith to operate the pilot valve which in turn opens or closes the valve controlling the withdrawal of top product thereby decreasing or increasing the flow of reflux to the column.

7. In a control device for a rectifying column with an outlet for vapor, means for condensing said vapor, means for withdrawing a part of the condensate as top product, means for returning the remainder of the condensate to the column as reflux, valve means to regulate the withdrawal of top product, a pilot valve to operate said valve means, and means to operate said pilot valve comprising a pair of Sylphon bellows, a reference sample on a plate in the column surrounded with liquid on the plate and containing a liquid of the composition and vapor pressure it is desired to recover, a line connecting the reference sample to one of the Sylphon bellows and a line connecting the space above the reference sample to the other Sylphon bellows, and a pivoted balance means having each end thereof connected to each of the Sylphon bellows and movable therewith to operate the pilot valve which in turn opens or closes the valve controlling the withdrawal of top product thereby decreasing or increasing the flow of reflux to the column.

8. A control device for a rectifying column with an outlet for vapor, means for condensing said vapor, an accumulator tank for receiving condensate from the condenser, a reflux connection leading from said accumulator tank to said column, a valve means responsive to the level of liquid in said accumulator tank to regulate the flow through said reflux connection, valve means to control the withdrawal of top product from said accumulator tank, a pilot valve to operate said valve means, and means to operate said pilot valve comprising a pair of opposed pressure operated members, a reference sample on a plate in the column surrounded with liquid on the plate and containing a liquid of the composition and vapor pressure it is desired to recover, a line connecting the reference sample to one of the pressure operated members and a line connecting the space above the reference sample to the other pressure operated member, and means connected to both pressure operated members and movable therewith to operate the pilot valve which in turn opens or closes the valve in the outlet to thereby decrease or increase the flow of reflux to the column.

9. In a control device for a rectifying column having an outlet for vapor and a feed inlet, means for condensing said vapor, means for withdrawing a part of the condensate as top product, means for returning the remainder of the condensate to the column as reflux, a valve means to regulate the withdrawal of top product, a pilot valve to operate said valve means and means to operate said pilot valve comprising a pair of opposed pressure operated members, a reference sample on a plate in the column surrounded with liquid on the plate and containing a liquid of the composition and vapor pressure it is desired to recover, a line connecting the reference sample to one of the pressure operated members and a line connecting the space above the reference sample to the other pressure operated member, and means connected to both pressure operated members and movable therewith to operate the pilot valve which in turn opens or closes the valve controlling the withdrawal of top product, and a valve means to control the flow through said feed inlet, a pilot valve to operate said valve means, and means to operate said pilot valve comprising a pair of opposed pressure operated members, a reference sample on a plate in the column below the feed inlet surrounded with liquid on the plate and containing a liquid of higher boiling point than the desired liquid, a line connecting the second reference sample to one of the pressure operated members and a line connecting the space above the reference sample of higher boiling point liquid to the other pressure operated member, and means connected to both pressure operated members and movable therewith to operate the second pilot valve which in turn opens or closes the valve in the feed inlet to increase or decrease the flow to the column.

10. In a control device for a rectifying column having an outlet for vapor and a feed inlet, means for condensing said vapor, means for withdrawing a part of the condensate as top product, means for returning the remainder of the condensate to the column as reflux, a valve means to regulate the withdrawal of top product, a pilot valve to operate said valve means, a means to operate said pilot valve comprising a pair of Sylphon bellows, a reference sample on a plate in the column surrounded with the liquid on the plate and containing a liquid of the composition and vapor pressure it is desired to recover, a line connecting the reference sample to one of the Sylphon bellows and a line connecting the space above the reference sample to the other Sylphon bellows, and means connected to the Sylphon bellows and movable therewith to operate the pilot valve which in turn opens or closes the valve controlling the withdrawal of top product to thereby decrease or increase the flow of reflux to the column, and a valve means to control the flow through said feed inlet, a pilot valve to operate said second valve means and means to operate said pilot valve comprising a pair of Sylphon bellows, a second sample on a plate in the column below the feed inlet surrounded with liquid on the plate and containing a liquid of higher boiling point than the desired liquid, a line connecting the reference sample to one of the Sylphon bellows, and a line connecting the space above the reference sample of higher boiling point liquid to the other Sylphon bellows, and means connected to the Sylphon bellows and movable therewith to operate the pilot valve which in turn opens or closes the valve in the feed inlet to increase or decrease the flow of feed to the column.

11. In a control device for a rectifying column having an outlet for vapor and a feed inlet, means for condensing said vapor, means for withdrawing a part of the condensate as top product, means for returning the remainder of the condensate to the column as reflux, a valve means to regulate the withdrawal of top product, a pilot valve to operate said valve means, a means to operate said pilot valve comprising a pair of Sylphon bellows, a reference sample on a plate in the column surrounded with the liquid on the plate and containing a liquid of the composition and vapor pressure it is desired to recover, a line connecting the reference sample to one of the Sylphon bellows and a line connecting the space above the reference sample to the other Sylphon bellows, and a pivoted balance means having the ends thereof connected to each of the Sylphon bellows and movable therewith to operate the pilot valve which in turn opens or closes the valve controlling the withdrawal of top product to thereby decrease or increase the flow of reflux to the column, and a valve means to control the flow through said feed inlet, a pilot valve to operate said second valve means and means to operate said pilot valve comprising a pair of Sylphon bellows, a second sample on a plate in the column below the feed inlet surrounded with liquid on the plate and containing a liquid of higher boiling point than the desired liquid, a line connecting the reference sample to one of the Sylphon bellows, and a line connecting the space above the reference sample of higher boiling point liquid to the other Sylphon bellows, and means connected to the Sylphon bellows and movable therewith to operate the pilot valve which in turn opens or closes the valve in the feed inlet to increase or decrease the flow of feed to the column.

12. In a control device for a rectifying column having a feed inlet and an outlet for vapor, a valve means to control the flow through said feed inlet, a pilot valve to operate said valve means, and means to operate said pilot valve comprising a pair of opposed pressure operated members, a reference sample on a plate in the column below the feed inlet surrounded with liquid on the plate and containing a liquid of higher boiling point than the desired liquid, a conduit connecting the reference sample to one of the pressure operated members and a conduit connecting the space above the reference sample of higher boiling point liquid to the other pressure operated member, and means connected to both pressure operated members and movable therewith to operate the pilot valve which in turn opens or closes the valve in the feed inlet to increase or decrease the flow of feed to the column.

SAMUEL C. CARNEY.